United States Patent
Nakada (10) Patent No.: US 10,112,607 B2
(45) Date of Patent: Oct. 30, 2018

(54) DRIVING SUPPORT DEVICE THAT PERFORMS DRIVING SUPPORT IN ACCORDANCE WITH CHARACTERISTICS AND SKILLS OF DRIVER

(71) Applicant: HONDA MOTOR CO., LTD., Tokyo (JP)

(72) Inventor: Yuki Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 15/276,966

(22) Filed: Sep. 27, 2016

(65) Prior Publication Data

US 2017/0088128 A1 Mar. 30, 2017

(30) Foreign Application Priority Data

Sep. 29, 2015 (JP) .................................. 2015-191143

(51) Int. Cl.
*B60W 30/02* (2012.01)
*B60W 30/12* (2006.01)
(Continued)

(52) U.S. Cl.
CPC ............ *B60W 30/02* (2013.01); *B60W 30/12* (2013.01); *B60W 30/143* (2013.01);
(Continued)

(58) Field of Classification Search
CPC .... B60W 30/02; B60W 30/12; B60W 30/143; B60W 40/09
See application file for complete search history.

(56) References Cited

U.S. PATENT DOCUMENTS

2013/0151074 A1* 6/2013 Takeuchi .............. B60W 10/06
701/37

FOREIGN PATENT DOCUMENTS

| JP | 2008-62787 A | 3/2008 |
| JP | 2012-22402 A | 2/2012 |

(Continued)

OTHER PUBLICATIONS

Office Action dated Aug. 8, 2017, issued in counterpart Japanese Application No. 2015-191143, with English machine translation. (6 pages).

(Continued)

*Primary Examiner* — Michael D Lang
(74) *Attorney, Agent, or Firm* — Westerman, Hattori, Daniels & Adrian, LLP (57) ABSTRACT

A driving support device includes a processing device that performs driving support by controlling in-vehicle equipment having an influence on running of a subject vehicle equipped with the driving support device. The processing device is configured to repeatedly obtain and store, at a predetermined time interval or a predetermined distance interval, a pair of values of longitudinal acceleration and lateral acceleration that are generated as a result of a driving operation performed by a driver, the longitudinal acceleration being an acceleration in a traveling direction of the subject vehicle, the lateral acceleration being an acceleration in a direction orthogonal to the traveling direction, and set at least one parameter of a support operation for performing the driving support, on the basis of a plurality of pairs each being the pair of the values of the longitudinal acceleration and the lateral acceleration repeatedly obtained and stored.

18 Claims, 3 Drawing Sheets

(51) Int. Cl.
 *B60W 30/14* (2006.01)
 *B60W 40/09* (2012.01)
 *B60W 50/00* (2006.01)

(52) U.S. Cl.
 CPC ..... *B60W 40/09* (2013.01); *B60W 2050/0088* (2013.01); *B60W 2520/105* (2013.01); *B60W 2520/125* (2013.01); *B60W 2540/30* (2013.01); *B60W 2720/106* (2013.01); *B60W 2720/125* (2013.01)

(56) References Cited

FOREIGN PATENT DOCUMENTS

| | | |
|---|---|---|
| JP | 4865711 B2 | 2/2012 |
| JP | 2012-61943 A | 3/2012 |
| JP | 5294193 B2 | 9/2013 |
| JP | 2014-80087 A | 5/2014 |

OTHER PUBLICATIONS

Office Action dated Apr. 3, 2018, issued in counterpart Japanese Application No. 2015-191143, with English machine translation. (7 pages).

\* cited by examiner

DRIVING SUPPORT DEVICE THAT PERFORMS DRIVING SUPPORT IN ACCORDANCE WITH CHARACTERISTICS AND SKILLS OF DRIVER

CROSS REFERENCES TO RELATED APPLICATIONS

The present application claims priority under 35 U.S.C. § 119 to Japanese Patent Application No. 2015-191143, filed Sep. 29, 2015, entitled "Driving Support Device That Performs Driving Support in Accordance with Characteristics and Skills of Driver." The contents of this application are incorporated herein by reference in their entirety.

TECHNICAL FIELD

The present disclosure relates to a driving support device that supports driving of a vehicle, and specifically to a driving support device that performs driving support in accordance with driving characteristics and driving skills of a driver.

BACKGROUND

There is a device that assesses the overall driving skills of a driver and performs driving support on the basis of a result of the assessment (see Japanese Patent No. 5294193). This device detects a driving status by using sensor data, such as a yaw rate, an acceleration, a steering angle, and an accelerator position, generates driving pattern information through statistical computation based on time-series data about the driving status, locating a driving pattern included in the driving pattern information in an assessment space for assessing similarity among driving patterns, assesses the level of driving skills in accordance with a distribution state of the driving pattern in the assessment space, and performs driving support on the basis of the assessment result of the driving skills.

Also, the following system is available as a technique for assessing the driving characteristics and the level of skills of a driver (see Japanese Patent No. 4865711). This system assesses the proficiency and driving characteristics of a driver by generating an event sequence (for example, a sequence representing a change in state, for example, a maximum value of lateral acceleration is generated before braking starts) from a data stream (for example, lateral acceleration, longitudinal acceleration, deceleration, and turning angle) representing a vehicle operation performed by the driver, and comparing the generated sequence with a sequence that is generated in advance and represents an unskilled driver, greatly-skilled driver, safety running operation, dangerous running operation, and so forth.

However, in the above-described device or system according to the related art, the types of data to be collected to determine the driving characteristics of a driver are wide-ranging and the amount of data to be processed is enormous. This results in a heavy computation load for data processing, longer processing time, and higher computation performance of a processing device. Accordingly, the cost of a device and system for supporting driving may increase.

Under the above-described circumstances, there is a demand for a driving support device that determines the driving characteristics and driving skills of a driver in a short time by easily collecting necessary data and that performs driving support in accordance with the determined driving characteristics and driving skills.

SUMMARY

According to an aspect of the present disclosure, there is provided a driving support device including a processing device that performs driving support by controlling in-vehicle equipment having an influence on running of a subject vehicle equipped with the driving support device. The processing device is configured to repeatedly obtain and store, at a predetermined time interval or a predetermined distance interval, a pair of values of longitudinal acceleration and lateral acceleration that are generated as a result of a driving operation performed by a driver, the longitudinal acceleration being an acceleration in a traveling direction of the subject vehicle, the lateral acceleration being an acceleration in a direction orthogonal to the traveling direction, and set at least one parameter of a support operation for performing the driving support, on the basis of a plurality of pairs each being the pair of the values of the longitudinal acceleration and the lateral acceleration repeatedly obtained and stored.

The processing device may be configured to plot points representing the plurality of pairs on a two-dimensional coordinate plane that includes two axes respectively representing the longitudinal acceleration and the lateral acceleration, generate a first shape, which is a closed shape, by connecting the plotted points adjacent to one another by line segments, and set one parameter of the support operation for performing the driving support, on the basis of the first shape.

The processing device may be configured to start a driving support operation if a current speed of the subject vehicle deviates from a predetermined speed range, and set the predetermined speed range as the one parameter of the support operation, the predetermined speed range increasing as an area of the first shape increases.

The processing device may be configured to plot points representing the plurality of pairs on a two-dimensional coordinate plane that includes two axes respectively representing the longitudinal acceleration and the lateral acceleration, generate a first shape, which is a closed shape, by connecting the plotted points adjacent to one another by line segments, generate a second shape, which is a closed shape, formed of a circumscribed curve of the first shape, calculate an area difference by subtracting an area of the first shape from an area of the second shape, and set one parameter of the support operation for performing the driving support, on the basis of the area difference.

The processing device may be configured to generate the second shape by generating circumscribed curves of the first shape, each corresponding to one quadrant of the two-dimensional coordinate plane, such that the circumscribed curves in adjacent quadrants are connected to one another, and connecting the circumscribed curves in the individual quadrants to one another.

The processing device may be configured to start a driving support operation if a current speed of the subject vehicle deviates from a predetermined speed range, and set the predetermined speed range as the one parameter of the support operation, the predetermined speed range increasing as the area difference decreases.

The processing device may be configured to set a maximum value of an acceleration and/or a deceleration allowed in the driving support, which is another parameter of the support operation, the maximum value increasing as absolute values of a maximum value and a minimum value of the values of the longitudinal acceleration and the lateral acceleration that are repeatedly obtained and stored increase.

The processing device may be configured to set a maximum value of an acceleration and/or a deceleration allowed in the driving support, which is another parameter of the support operation, the maximum value increasing as the area of the second shape increases.

The processing device may be configured to perform the driving support during decelerated running that includes running around a curve and/or on a road near the curve, on the basis of a target deceleration value, which is one parameter of the support operation, and calculate an average value of longitudinal deceleration during deceleration from the values of the longitudinal acceleration repeatedly obtained and stored, and set the calculated average value as the target deceleration value.

The values of the longitudinal acceleration and the lateral acceleration that are repeatedly obtained may be stored in association with categories of a road environment in which the subject vehicle runs, and the driving support in the road environment of a corresponding one of the categories may be performed on the basis of the values of the longitudinal acceleration and the lateral acceleration that are stored in association with the category.

According to another aspect of the present disclosure, there is provided a method for performing, with a processing device, driving support by controlling in-vehicle equipment having an influence on running of a subject vehicle equipped with the processing device. The method includes repeatedly obtaining and storing, at a predetermined time interval or a predetermined distance interval, a pair of values of longitudinal acceleration and lateral acceleration that are generated as a result of a driving operation performed by a driver, the longitudinal acceleration being an acceleration in a traveling direction of the subject vehicle, the lateral acceleration being an acceleration in a direction orthogonal to the traveling direction; and setting at least one parameter of a support operation for performing the driving support, on the basis of a plurality of pairs each being the pair of the values of the longitudinal acceleration and the lateral acceleration repeatedly obtained and stored.

The method may further include plotting points representing the plurality of pairs on a two-dimensional coordinate plane that includes two axes respectively representing the longitudinal acceleration and the lateral acceleration, and generating a first shape, which is a closed shape, by connecting the plotted points adjacent to one another by line segments; and starting a driving support operation if a current speed of the subject vehicle deviates from a predetermined speed range. The predetermined speed range may be set as one parameter of the support operation, the predetermined speed range increasing as an area of the first shape increases.

The method may further include plotting points representing the plurality of pairs on a two-dimensional coordinate plane that includes two axes respectively representing the longitudinal acceleration and the lateral acceleration, and generating a first shape, which is a closed shape, by connecting the plotted points adjacent to one another by line segments; generating a second shape, which is a closed shape, formed of a circumscribed curve of the first shape; calculating an area difference by subtracting an area of the first shape from an area of the second shape; and starting a driving support operation if a current speed of the subject vehicle deviates from a predetermined speed range. The predetermined speed range may be set as one parameter of the support operation, the predetermined speed range increasing as the area difference decreases.

An absolute value of a maximum value and/or a minimum value of the longitudinal acceleration and/or the lateral acceleration allowed in the driving support, which is one parameter of the support operation, may be set, the absolute value increasing as absolute values of a maximum value and a minimum value of the values of the longitudinal acceleration and the lateral acceleration that are repeatedly obtained and stored increase.

An absolute value of a maximum value and/or a minimum value of the longitudinal acceleration and/or the lateral acceleration allowed in the driving support, which is one parameter of the support operation, may be set, the absolute value increasing as the area of the second shape increases.

BRIEF DESCRIPTION OF THE DRAWINGS

The advantages of the disclosure will become apparent in the following description taken in conjunction with the following drawings.

DETAILED DESCRIPTION

Figure 1:
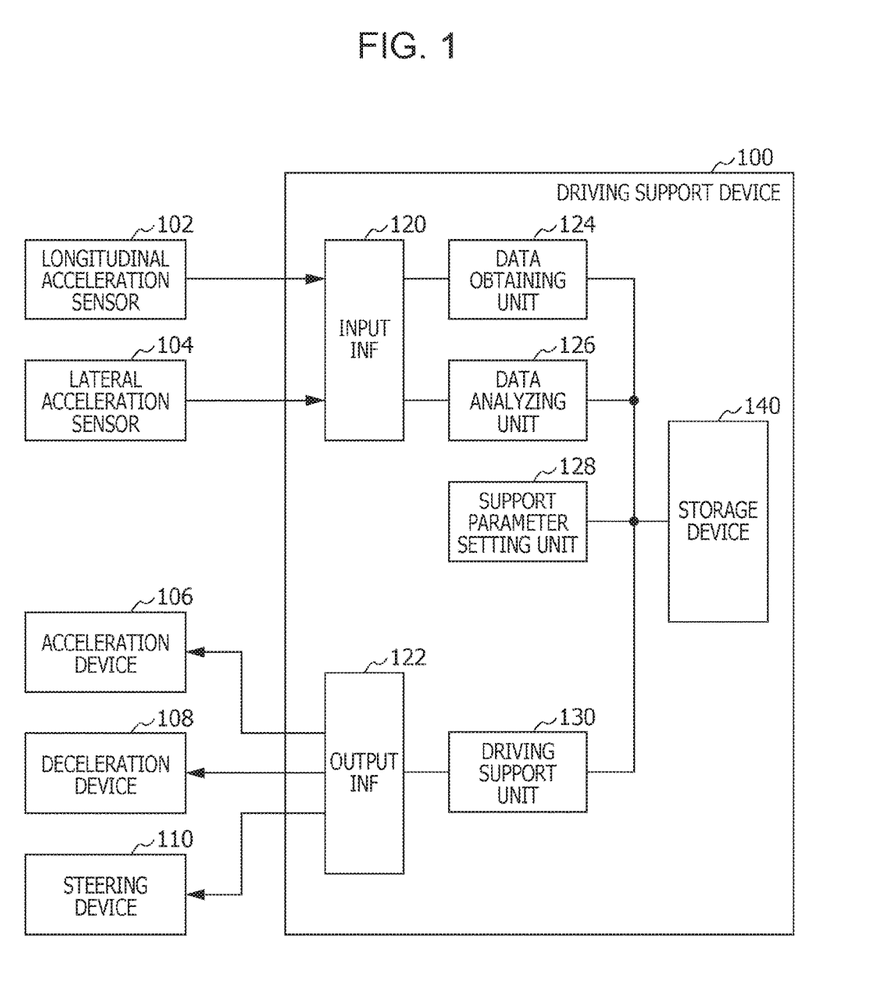
FIG. 1 is a diagram illustrating the configuration of a driving support device according to an embodiment of the present disclosure.

Hereinafter, an embodiment of the present disclosure will be described with reference to the attached drawings. FIG. 1 is a diagram illustrating the configuration of a driving support device 100 according to an embodiment of the present disclosure. The driving support device 100 may be a part of a driving support system, such as a lane keep assist system (LKAS) or an adaptive cruise control (ACC) system.

The driving support device 100 (hereinafter simply referred to as a "support device 100") is a computer including a processor (processing device) such as a central processing unit (CPU), a read only memory (ROM) containing a program written thereon, and a random access memory (RAM) for temporarily storing data, and is used by being equipped in a vehicle. Hereinafter, a vehicle equipped with the support device 100 is referred to as a subject vehicle. The driving support device 100 may be embodied by an electronic control unit (ECU).

The support device 100 receives a sensor signal from a longitudinal acceleration sensor 102 that senses a longitudinal acceleration, which is an acceleration in a traveling direction of the subject vehicle; receives a sensor signal from a lateral acceleration sensor 104 that senses a lateral acceleration, which is an acceleration in a direction orthogonal to the traveling direction; and controls an acceleration device 106, a deceleration device 108, and a steering device 110 that respectively operate an accelerator, a brake, and a handle, which correspond to in-vehicle equipment having an influence on running of the subject vehicle. More specifically, the accelerator may be an actuator or the like of a throttle valve of an internal combustion engine in a case where the subject vehicle is driven by the internal combustion engine, and may be a power adjustor or the like that adjusts the power supplied to a motor in a case where the subject vehicle is an electric car driven by the motor.

The support device 100 includes an input interface (input INF) 120 for receiving various input signals from the above-described sensors and devices and an output interface (output INF) 122 for outputting control signals to the acceleration device 106, the deceleration device 108, and the steering device 110.

The support device 100 further includes a data obtaining unit 124, a data analyzing unit 126, a support parameter setting unit 128, and a driving support unit 130.

The above-described individual units included in the support device 100 are implemented when the support device 100, which is a computer, executes a program (for example, by using the processor (processing device) included in the support device 100), and the computer program may be stored in a computer-readable storage medium. Alternatively, all or some of the above-described units may be configured by hardware units each including one or more electronic circuit components.

The support device 100 further includes a storage device 140 for saving and storing map information and so forth.

The data obtaining unit 124 repeatedly obtains, at a predetermined time interval or a predetermined distance interval, a pair of values of longitudinal acceleration and lateral acceleration that are generated as a result of a driving operation performed by a driver, and stores the pair in the storage device 140. The longitudinal acceleration is an acceleration in a travelling direction of the subject vehicle, and the lateral acceleration is an acceleration in a direction orthogonal to the travelling direction. The pair serves as data representing the driving characteristics and driving skills of the driver. More specifically, the data obtaining unit 124 obtains, from the longitudinal acceleration sensor 102 and the lateral acceleration sensor 104, values of longitudinal acceleration and lateral acceleration simultaneously within a range of a predetermined time difference and repeatedly at a predetermined time interval or a predetermined distance interval, makes a pair of the values of longitudinal acceleration and lateral acceleration obtained simultaneously within the range of the predetermined time difference, and stores the pair in the storage device 140. Accordingly, a plurality of pairs of values of longitudinal acceleration and lateral acceleration are obtained through the repetition of obtainment at the predetermined time interval or the predetermined distance interval and are stored in the storage device 140.

The data analyzing unit 126 analyzes the data representing the values of longitudinal acceleration and lateral acceleration that have been repeatedly obtained and stored in the storage device 140, and outputs a result of the analysis. Specifically, the data analyzing unit 126 plots points representing the pairs of the values of longitudinal acceleration and lateral acceleration that have been repeatedly obtained and stored, on a two-dimensional coordinate plane that includes two axes respectively representing longitudinal acceleration and lateral acceleration, connects the plotted points adjacent to one another by line segments, and thereby generates a first shape, which is a closed shape. Also, the data analyzing unit 126 generates a second shape, which is a circumscribed curve of the first shape.

The data analyzing unit 126 calculates the areas of the first and second shapes and an area difference which is obtained by subtracting the area of the first shape from the area of the second shape, and outputs the calculated areas and area difference, which serve as analysis data representing the driving characteristics and driving skills of the driver, by storing them in the storage device 140.

The support parameter setting unit 128 sets a parameter of a support operation for performing driving support by the driving support unit 130 (described below) on the basis of the analysis data. The function of the support parameter setting unit 128 will be further described below in association with the description of FIGS. 2A to 2C illustrating an example of data analysis performed by the data analyzing unit 126.

The driving support unit 130 performs driving support by controlling running of the subject vehicle by using the acceleration device 106, the deceleration device 108, and the steering device 110 on the basis of the parameter of the support operation set by the support parameter setting unit 128 on the basis of the analysis data. Accordingly, the driving support unit 130 performs driving support on the subject vehicle in accordance with the driving characteristics and/or driving skills of the driver represented by the analysis data.

Specifically, the driving support unit 130 starts a predetermined driving support operation if a current speed of the subject vehicle deviates from a predetermined speed range set by the support parameter setting unit 128. Also, the driving support unit 130 controls, on the basis of a maximum value of an acceleration and/or a deceleration allowed in the driving support and set by the support parameter setting unit 128, running of the subject vehicle by using an acceleration and/or a deceleration within the range up to the maximum value. Alternatively, the driving support unit 130 performs driving support during decelerated running around a curve and/or on a road near the curve on the basis of a target deceleration value set by the support parameter setting unit 128.

Figure 2A:
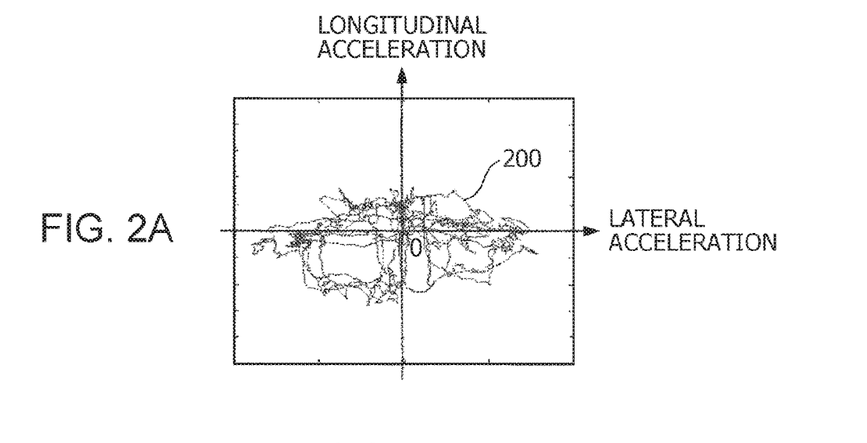
FIGS. 2A to 2C are explanatory diagrams for describing data analysis about a plurality of pairs of values of longitudinal acceleration and lateral acceleration obtained during driving by a driver, performed in the driving support device illustrated in FIG. 1.
Figure 2B:
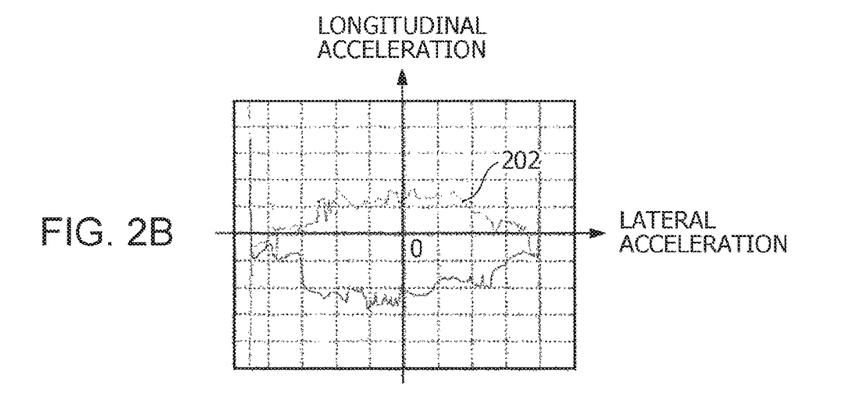
Figure 2C:
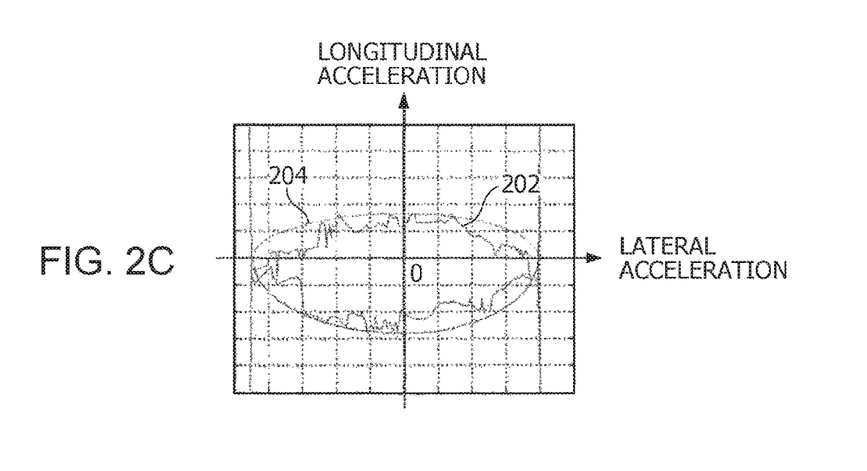

FIGS. 2A to 2C are explanatory diagrams for describing data analysis performed by the data analyzing unit 126 on a plurality of pairs of values of longitudinal acceleration and lateral acceleration obtained by the data obtaining unit 124. In FIGS. 2A to 2C, the vertical axis represents longitudinal acceleration and the horizontal axis represents lateral acceleration. More specifically, in the vertical axis, the region above the origin represents the acceleration in the forward direction of the subject vehicle, whereas the region below the origin represents the deceleration in the forward direction of the subject vehicle. In the horizontal axis, the region to the right of the origin represents the acceleration to the right relative to the forward direction of the subject vehicle, whereas the region to the left of the origin represents the deceleration to the right relative to the forward direction of the subject vehicle (in other words, the acceleration to the left relative to the forward direction of the subject vehicle).

FIG. 2A illustrates an example of plotting, on a two-dimensional coordinate plane, a plurality of pairs of values of longitudinal acceleration and lateral acceleration that have been obtained by the data obtaining unit 124 through the repetition of obtainment at the predetermined time interval. FIG. 2A includes an indefinitely shaped graph 200 in which the plotted points are connected to one another in time series.

By using the plot illustrated in FIG. 2A, the data analyzing unit 126 first erases lines connecting the individual plotted points in time series, connects the plotted points adjacent to one another in the two-dimensional coordinate plane, and thereby generates a first shape 202, which is a closed shape, as illustrated in FIG. 2B. Furthermore, the data analyzing unit 126 generates, by forming a circumscribed curve of the first shape 202, a second shape 204, which is a closed shape, as illustrated in FIG. 2C.

In this embodiment, the data analyzing unit 126 generates circumscribed curves of the first shape 202, each corresponding to one quadrant of the two-dimensional coordinate plane, and connects these circumscribed curves to generate the second shape 204. That is, the circumscribed curves generated for individual quadrants are formed such that the circumscribed curves in adjacent quadrants are connected to one another. More specifically, in this embodiment, the circumscribed curve generated for each quadrant is a quarter ellipse having a central angle of 90 degrees.

The first shape 202 illustrated in FIG. 2B represents variations in the combination of longitudinal acceleration and lateral acceleration generated in the subject vehicle by the driver on a running course involving change of the travelling direction of the subject vehicle or turn, such as a curve. In general, running at "a large longitudinal acceleration and a large lateral acceleration" is unreasonable and dangerous. A driver with great driving skills tends to drive in a manner that lateral acceleration decreases as longitudinal acceleration increases and that longitudinal acceleration and lateral acceleration change while maintaining a substantially constant relationship. Thus, a driver with greater driving skills exhibits the first shape 202 formed of a smoother curve (for example, a shape closer to an ellipse).

Thus, in this embodiment, the second shape 204 formed of a circumscribed ellipse corresponding to the individual quadrants of the first shape 202 is generated for the first shape 202 illustrated in FIG. 2B, as illustrated in FIG. 2C, and the second shape 204 is regarded as a kind of target state indicating great driving skills. The driving skills of the driver are determined to be greater as the area difference between the second shape 204 and the first shape 202 decreases.

As a result, for example, the support parameter setting unit 128 sets the above-described predetermined speed range, which is a determination criterion of whether or not to start a predetermined driving support operation, the predetermined speed range increasing as the area difference between the first shape 202 and the second shape 204 decreases (that is, as the driving skills of the driver increases), so that intervention by the driving support operation is less likely to be started.

The size of the second shape 204 illustrated in FIG. 2C represents the widths of change in longitudinal acceleration and lateral acceleration. If the driver likes enjoying the acceleration and deceleration that occur during running (so-called "sporty driving"), the widths of change are large and accordingly the size of the second shape 204 is large. Thus, in this embodiment, a larger area of the second shape 204 represents a stronger preference for "sporty driving" of the driver.

As a result, for example, the support parameter setting unit 128 sets a maximum value of an acceleration and/or a deceleration for performing driving support (that is, a maximum value of an acceleration and/or a deceleration allowed in the driving support), the maximum value increasing as the area of the second shape 204 increases, so that driving support more suitable for preference for sporty driving may be performed.

That is, the support device 100 having the above-described configuration measures pairs of values of longitudinal acceleration and lateral acceleration that are generated in the subject vehicle as a result of a driving operation performed by a driver by using acceleration sensors (denoted by 102 and 104 in FIG. 1) generally equipped in a vehicle, and determines the driving characteristics and driving skills of the driver through simple calculation, such as calculation of the areas of shapes in a two-dimensional plot representing the pairs (FIGS. 2A to 2C). Accordingly, the support device 100 is able to determine the driving characteristics and driving skills of the driver in a short time by easily collecting necessary data and to perform driving support in accordance with the determined driving characteristics and driving skills.

In this embodiment, the reason for generating a quarter ellipse for each quadrant of the two-dimensional coordinate plane to generate the second shape 204 is as follows. In general, the behavior in a driving operation often differs between an operation of turning to the right and an operation of turning to the left (for example, in a case where the driver's seat is on the right side, an operation of turning to the right is easier, and the lateral acceleration in the left direction (the negative lateral acceleration in the two-dimensional coordinate system illustrated in FIGS. 2A to 2C) tends to be larger than the lateral acceleration in the right direction (the positive lateral acceleration in the two-dimensional coordinate system)). Furthermore, the degree of the foregoing difference varies among drivers and also the difference between preference for acceleration and preference for deceleration in the travelling direction (longitudinal direction) of the vehicle varies among drivers, and thus the circumscribed curve of the first shape 202 is not necessarily symmetric with respect to the origin. Thus, the driving characteristics and driving skills of the driver can be determined more accurately by generating a circumscribed curve for each quadrant.

In this embodiment, the driving skills of the driver are determined to be greater as the area difference obtained by subtracting the area of the first shape 202 from the area of the second shape 204 decreases, as described above. However, since the area difference decreases as the area of the first shape 202 increases, the driving skills of the driver may be determined to be greater as the area of the first shape 202 increases. In this case, it is not necessary to generate the second shape 204 and thus the process performed by the support device 100 is further reduced. As a result of such a determination, for example, the support parameter setting unit 128 sets the predetermined speed range, which is a determination criterion of whether or not to start the predetermined driving support operation, the predetermined speed range increasing as the area of the first shape 202 increases, so that intervention by the driving support operation is less likely to be started.

In this embodiment, a larger area of the second shape 204 represents a stronger preference for "sporty driving" of the driver, and a larger maximum value of an acceleration and/or a deceleration for performing driving support is set, but the embodiment is not limited thereto. Alternatively, larger absolute values of maximum and minimum values of the obtained longitudinal acceleration (a maximum value of longitudinal acceleration and a maximum value of longitudinal deceleration) and maximum and minimum values of the obtained lateral acceleration (a maximum value of lateral acceleration in the right direction and a maximum value of lateral acceleration in the left direction), for example, a larger average value of the absolute values of the maximum and minimum values, or a larger average value of differences between individual maximum values and minimum values, may represent a stronger preference for "sporty driving" of the driver, and a larger maximum value of an acceleration and/or a deceleration for performing driving support may be set.

Figure 3:
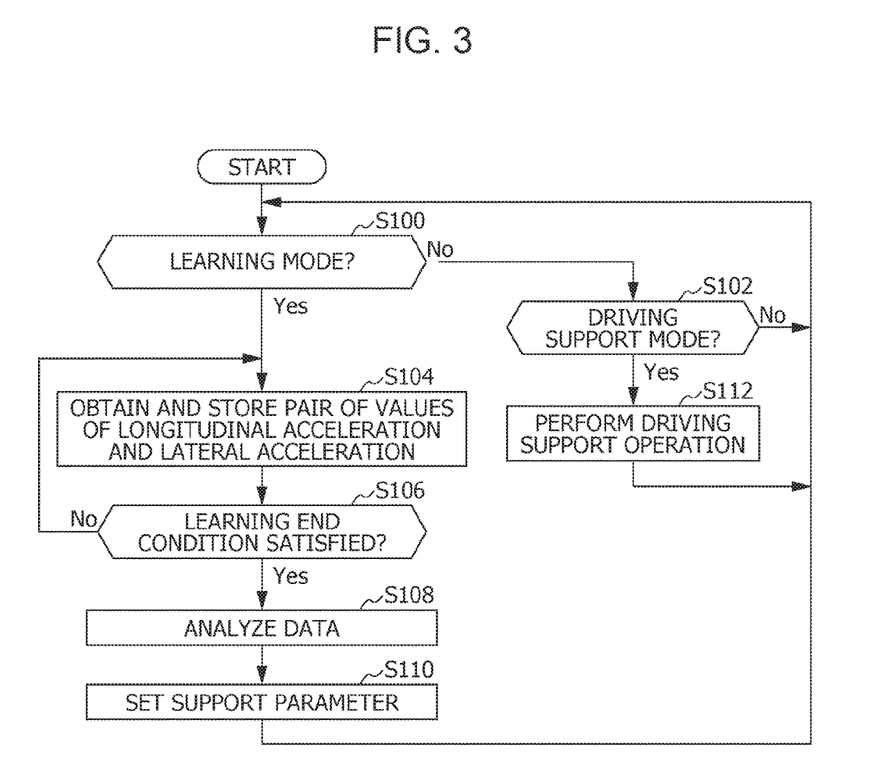
FIG. 3 is a flowchart illustrating a procedure of a process performed by the driving support device illustrated in FIG. 1.

Next, the procedure of a process performed by the support device 100 will be described with reference to the flowchart illustrated in FIG. 3. This process starts upon power-on of the support device 100 and ends upon power-off of the support device 100.

Upon start of the process, the support device 100 determines whether or not the operation mode that is currently set in the support device 100 is a learning mode (S100). If the operation mode is not the learning mode (NO in S100), the support device 100 further determines whether or not the operation mode that is currently set in the support device 100 is a driving support mode (S102). If the operation mode is not the driving support mode (NO in S102), the process returns to step S100 and the process is repeated.

The operation mode can be set to the support device 100 by a user operation of a selection switch (not illustrated) connected to the support device 100, for example. Alternatively, for example, the operation may be input by the user via a display device equipped with a touch screen (not illustrated) connected to the support device 100, so that the input operation mode can be set to the support device 100. The operation mode that is set may be the learning mode, the driving support mode, or a standby mode (a mode to wait for the learning mode or the driving support mode to be set).

If it is determined in step S100 that the currently set operation mode is the learning mode (YES in S100), the support device 100 obtains, by using the data obtaining unit 124, a pair of values of longitudinal acceleration and lateral acceleration generated as a result of a driving operation performed by the driver from the longitudinal acceleration sensor 102 and the lateral acceleration sensor 104, and stores the pair in the storage device 140 (S104).

Subsequently, the support device 100 determines whether or not a learning end condition is satisfied (S106). If the learning end condition is not satisfied (NO in S106), the process returns to step S104 and the process is repeated. Here, the learning end condition may be, for example, an ignition switch or the like of an internal combustion engine serving as a driving device included in the subject vehicle has been turned off to terminate a driving cycle, an instruction to end learning is input by the user by operating a specific switch (not illustrated) provided in the support device 100, or the number of pairs of values of longitudinal acceleration and lateral acceleration stored in the storage device 140 has reached a predetermined number.

If it is determined in step S106 that the learning end condition is not satisfied and if step S104 is repeated, the execution time of step S104 is managed so that step S104 is executed at a predetermined time interval or a predetermined distance interval.

On the other hand, if it is determined in step S106 that the learning end condition is satisfied (YES in step S106), the data analyzing unit 126 analyzes the data of longitudinal acceleration and lateral acceleration that are repeatedly obtained and stored in the storage device 140 and outputs an analysis result by storing it in the storage device 140 (S108). As described above, the analysis result may be the area of a first closed shape, which is generated by plotting, on a two-dimensional coordinate plane, a plurality of pairs of values of longitudinal acceleration and lateral acceleration stored in the storage device 140, and an area difference between the area of the first shape and the area of a second closed shape, which is formed of a circumscribed curve of the first shape.

Subsequently, the support parameter setting unit 128 sets, on the basis of the analysis result output by the data analyzing unit 126 in step S108, at least one parameter of a support operation for performing driving support by the driving support unit 130 (S110), and the process returns to step S100 and the process is repeated. The specific examples of the parameter that is set here have been described above with reference to FIGS. 2A to 2C. The support parameter setting unit 128 stores, in the storage device 140, the at least one parameter that has been set.

On the other hand, if it is determined in step S102 that the operation mode is the driving support mode (YES in S102), the support device 100 performs, by using the driving support unit 130, predetermined driving support on running of the subject vehicle by referring to the setting of the parameter of the support operation stored in the storage device 140 by the support parameter setting unit 128 in step S110 and controlling the acceleration device 106, the deceleration device 108, and/or the steering device 110 on the basis of the setting (S112). After the driving support has finished, the process returns to step S100 and the process is repeated.

In this embodiment, the learning mode, the driving support mode, or the standby mode is set as the operation mode. Alternatively, the learning mode and the driving support mode may be fractionalized to provide learning modes and driving support modes in individual categories of road environment, for example, an urban area and a mountainous area. In this case, the plurality of pairs of values of longitudinal acceleration and lateral acceleration obtained by the data obtaining unit 124 and the parameter of the support operation output by the data analyzing unit 126 may be stored in the storage device 140 in association with the categories of road environment when the pairs are measured. Also, when driving support is performed, a parameter of a support operation stored in association with the category of the environment of the road on which the subject vehicle is currently running may be used. The category of the road environment when the pairs are measured and the category of the road environment when driving support is performed may be determined by the support device 100 with reference to map information or the like stored in advance in the storage device 140 or may be input by the user via a touch panel or the like connected to the support device 100, for example.

Furthermore, a parameter of a support operation based on data analysis not using the above-described two-dimensional coordinate plot may also be set. For example, the driving support unit 130 may perform driving support during decelerated running, including running around a curve and/or on a road near the curve, on the basis of a target deceleration value, which is one parameter of a support operation. The data analyzing unit 126 may calculate an average deceleration from the data of longitudinal accelerations repeatedly obtained by the data obtaining unit 124. The support parameter setting unit 128 may set the value of the average deceleration as the target deceleration value.

As described above, in the support device 100 according to the embodiment, pairs of values of longitudinal acceleration and lateral acceleration generated in the subject vehicle as a result of a driving operation performed by a driver are measured by using the acceleration sensors 102 and 104 that are generally mounted in a vehicle, and the driving characteristics and driving skills of the driver are determined through simple calculation, such as calculation of the areas of shapes obtained by connecting the pairs plotted on a two-dimensional coordinate plane. Therefore, the support device 100 is able to determine the driving characteristics and driving skills of the driver in a short time by easily collecting necessary data and to perform driving support in accordance with the determined driving characteristics and driving skills. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A driving support device comprising:
   a processing device that performs driving support by controlling in-vehicle equipment having an influence on running of a subject vehicle equipped with the driving support device,
   the processing device being configured to
   repeatedly obtain and store, at a predetermined time interval or a predetermined distance interval, a pair of a value of longitudinal acceleration and a value of lateral acceleration that are generated as a result of a driving operation performed by a driver, the longitudinal acceleration being an acceleration in a traveling direction of the subject vehicle, the lateral acceleration being an acceleration in a direction orthogonal to the traveling direction,
   set at least one parameter of a support operation for performing the driving support, by using a plurality of pairs of the value of the longitudinal acceleration and the value of the lateral acceleration, repeatedly obtained and stored,
   plot points, each representing the respective pairs, on a two-dimensional coordinate plane that includes two axes respectively representing the longitudinal acceleration and the lateral acceleration,
   generate a first shape, which is a closed shape, by connecting the plotted points adjacent to one another by line segments,
   generate a second shape, which is a closed shape, formed of a circumscribed curve of the first shape,
   calculate an area difference by subtracting an area of the first shape from an area of the second shape, and
   set the one parameter of the support operation for performing the driving support, by using the area difference.

2. The driving support device according to claim 1, the processing device being configured to
   set another parameter of the support operation for performing the driving support, by using the first shape.

3. The driving support device according to claim 2, the processing device being configured to
   start a driving support operation if a current speed of the subject vehicle deviates from a predetermined speed range, and
   set the predetermined speed range as the another parameter of the support operation such that the predetermined speed range increases as an area of the first shape increases.

4. The driving support device according to claim 2, wherein the first shape is a contour of a figure constituted by the points.

5. The driving support device according to claim 1, the processing device being configured to generate the second shape by, for each quadrant of the two-dimensional coordinate plane, generating a section of the circumscribed curve of the first shape in the quadrant, such that two sections of the circumscribed curve in adjacent quadrants are continuously connected to one another, and connecting the sections of the circumscribed curve in the individual quadrants to one another.

6. The driving support device according to claim 5, the processing device being configured to generate, for each quadrant of the two-dimensional coordinate plane, the section of the circumscribed curve of the first shape in the quadrant, such that the sections are asymmetry with one another with respect to the origin of the two-dimensional coordinate plane.

7. The driving support device according to claim 1, the processing device being configured to
   start a driving support operation if a current speed of the subject vehicle deviates from a predetermined speed range, and
   set the predetermined speed range as the one parameter of the support operation such that the predetermined speed range increases as the area difference decreases.

8. The driving support device according to claim 1, the processing device being configured to set an allowable maximum value of an acceleration and/or a deceleration allowed in the driving support, which is another parameter of the support operation, such that the allowable maximum value increases as absolute values of a maximum value and a minimum value of the values of the longitudinal acceleration and the lateral acceleration that are repeatedly obtained and stored increase.

9. The driving support device according to claim 1, the processing device being configured to set an allowable maximum value of an acceleration and/or a deceleration allowed in the driving support, which is another parameter of the support operation, such that the allowable maximum value increases as the area of the second shape increases.

10. The driving support device according to claim 1, the processing device being configured to
    perform the driving support during decelerated running that includes running on a curve and/or on a road near the curve, in accordance with a target deceleration value, which is one parameter of the support operation, and
    calculate an average value of longitudinal deceleration during deceleration from the values of the longitudinal acceleration repeatedly obtained and stored, and set the calculated average value as the target deceleration value.

11. The driving support device according to claim 1, wherein the value of the longitudinal acceleration and the value of the lateral acceleration that are repeatedly obtained are stored in association with categories of a road environment of the road in which the subject vehicle runs, and the processing device performs the driving support when driving in a predetermined road environment by using the value of the longitudinal acceleration and the value of the lateral acceleration that are stored in association with the category corresponding to the predetermined road environment.

12. The driving support device according to claim 1, wherein the pair serves as data representing driving characteristics and driving skills of the driver.

13. The driving support device according to claim 1, wherein the pair of the value of the longitudinal acceleration and the value of the lateral acceleration are obtained simultaneously within a range of a predetermined time difference from a longitudinal acceleration sensor and a lateral acceleration sensor.

14. The driving support device according to claim 1, wherein it is assumed that driving skills of the driver become greater as the area difference decreases.

15. A method for performing, with a processing device, driving support by controlling in-vehicle equipment having an influence on running of a subject vehicle equipped with the processing device, the method comprising:
repeatedly obtaining and storing, by the processing device, at a predetermined time interval or a predetermined distance interval, a pair of a value of longitudinal acceleration and a value of lateral acceleration that are generated as a result of a driving operation performed by a driver, the longitudinal acceleration being an acceleration in a traveling direction of the subject vehicle, the lateral acceleration being an acceleration in a direction orthogonal to the traveling direction; and
setting, by the processing device, at least one parameter of a support operation for performing the driving support, by using a plurality of pairs of the value of the longitudinal acceleration and the value of the lateral acceleration repeatedly obtained and stored,
wherein the method further comprises:
plotting, by the processing device, points each representing the respective pairs on a two-dimensional coordinate plane that includes two axes respectively representing the longitudinal acceleration and the lateral acceleration, and generating a first shape, which is a closed shape, by connecting the plotted points adjacent to one another by line segments;
generating, by the processing device, a second shape, which is a closed shape, formed of a circumscribed curve of the first shape;
calculating, by the processing device, an area difference by subtracting an area of the first shape from an area of the second shape; and
starting a driving support operation if a current speed of the subject vehicle deviates from a predetermined speed range,
wherein the predetermined speed range is set as the one parameter of the support operation such that the predetermined speed range increases as the area difference decreases.

16. The method according to claim 15,
wherein the predetermined speed range is set as another parameter of the support operation such that the predetermined speed range increases as an area of the first shape increases.

17. The method according to claim 15, wherein an absolute value of an allowable maximum value and/or a minimum value of the longitudinal acceleration and/or the lateral acceleration allowed in the driving support, which is one parameter of the support operation, is set, such that the absolute value increases as absolute values of a maximum value and a minimum value of the values of the longitudinal acceleration and the lateral acceleration that are repeatedly obtained and stored increase.

18. The method according to claim 15, wherein an absolute value of an allowed maximum value and/or a minimum value of the longitudinal acceleration and/or the lateral acceleration allowed in the driving support, which is one parameter of the support operation, is set, such that the absolute value increases as the area of the second shape increases.

* * * * *